US012385219B2

United States Patent
Shiratani et al.

(10) Patent No.: US 12,385,219 B2
(45) Date of Patent: Aug. 12, 2025

(54) SHOVEL

(71) Applicant: SUMITOMO CONSTRUCTION MACHINERY CO., LTD., Tokyo (JP)

(72) Inventors: Ryuji Shiratani, Chiba (JP); Hiroyuki Kurokawa, Chiba (JP); Hajime Aragaki, Chiba (JP)

(73) Assignee: SUMITOMO CONSTRUCTION MACHINERY CO., LTD., Tokyo (JP)

( * ) Notice: Subject to any disclaimer, the term of this patent is extended or adjusted under 35 U.S.C. 154(b) by 926 days.

(21) Appl. No.: 17/034,554

(22) Filed: Sep. 28, 2020

(65) Prior Publication Data

US 2021/0025134 A1  Jan. 28, 2021

Related U.S. Application Data

(63) Continuation of application No. PCT/JP2019/013787, filed on Mar. 28, 2019.

(30) Foreign Application Priority Data

Mar. 30, 2018 (JP) ................. 2018-070027

(51) Int. Cl.
*E02F 9/20* (2006.01)
*E02F 9/08* (2006.01)
*F16N 7/14* (2006.01)
*F16N 27/02* (2006.01)
*F16N 29/02* (2006.01)

(52) U.S. Cl.
CPC .......... *E02F 9/2025* (2013.01); *E02F 9/0875* (2013.01); *F16N 7/14* (2013.01); *F16N 27/02* (2013.01); *F16N 29/02* (2013.01)

(58) Field of Classification Search
CPC ........ E02F 9/0875; E02F 9/2025; F16N 7/14; F16N 27/02; F16N 29/02
See application file for complete search history.

(56) References Cited

U.S. PATENT DOCUMENTS

| 4,244,447 | A | 1/1981 | Hanitz |
| 9,551,460 | B2* | 1/2017 | Conley ..................... F16N 7/38 |
| 9,683,697 | B2* | 6/2017 | Conley ..................... F16N 29/00 |
| 2004/0090296 | A1 | 5/2004 | Ojima et al. |
| 2012/0132483 | A1* | 5/2012 | Conley ..................... F16N 7/14 |
| | | | 184/6.28 |

(Continued)

FOREIGN PATENT DOCUMENTS

| EP | 0612891 | 8/1994 |
| EP | 2198194 | 6/2010 |

(Continued)

OTHER PUBLICATIONS

International Search Report for PCT/JP2019/013787 mailed on Jun. 25, 2019.

*Primary Examiner* — Minh Truong
(74) *Attorney, Agent, or Firm* — IPUSA, PLLC

(57) ABSTRACT

A shovel includes an undercarriage, an upper swing structure swingably attached to the undercarriage, and an automatic greaser mounted on the upper swing structure. The automatic greaser is configured to individually change the amount of grease fed to a first greasing point among multiple greasing points and the amount of grease fed to a second greasing point among the multiple greasing points based on information on the multiple greasing points.

8 Claims, 10 Drawing Sheets

(56) References Cited

U.S. PATENT DOCUMENTS

| | | | |
|---|---|---|---|
| 2013/0277148 A1* | 10/2013 | Beck | F16N 29/02 |
| | | | 184/7.4 |
| 2017/0114957 A1* | 4/2017 | Conley | F16N 29/02 |
| 2018/0017210 A1* | 1/2018 | Letscher | F16N 29/02 |

FOREIGN PATENT DOCUMENTS

| | | |
|---|---|---|
| JP | H01-190837 | 7/1989 |
| JP | H05-042895 U | 6/1993 |
| JP | H06-014252 U | 2/1994 |
| JP | H06-123121 | 5/1994 |
| JP | H09-137466 | 5/1997 |
| JP | 2572204 U | 3/1998 |
| JP | H10-237896 | 9/1998 |
| JP | H10-237897 | 9/1998 |
| JP | 2000-074292 | 3/2000 |
| JP | 2000-213690 | 8/2000 |
| JP | 2003-097677 | 4/2003 |
| JP | 2006-010014 | 1/2006 |

* cited by examiner

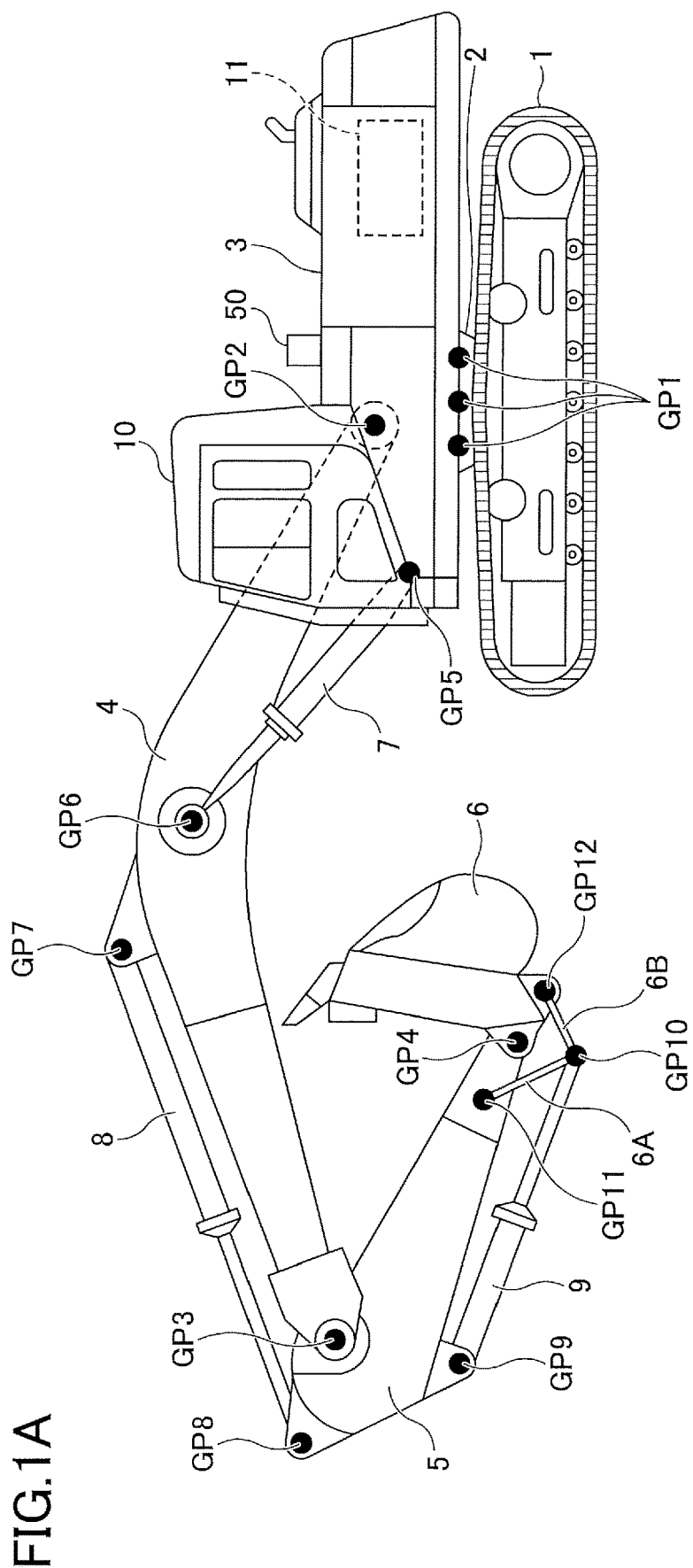
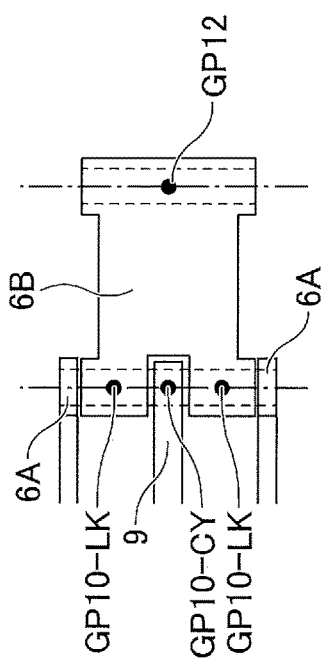
FIG.1A
FIG.1B

SHOVEL

CROSS-REFERENCE TO RELATED APPLICATIONS

This application is a continuation application filed under 35 U.S.C. 111(a) claiming benefit under 35 U.S.C. 120 and 365(c) of PCT International Application No. PCT/JP2019/013787, filed on Mar. 28, 2019 and designating the U.S., which claims priority to Japanese patent application No. 2018-070027, filed on Mar. 30, 2018. The entire contents of the foregoing applications are incorporated herein by reference.

BACKGROUND

Technical Field

The present invention relates to shovels with an automatic greasing device.

Description of Related Art

A shovel with an automatic greaser has been known. This automatic greaser is configured to feed grease to pin linking members placed between the swing frame of an upper swing structure and a boom, between the boom and an arm, between the arm and a bucket, on each end side of a boom cylinder, on each end side of an arm cylinder, on each end side of a bucket cylinder and so on. Furthermore, the automatic greaser is configured to, when any of the load pressure of the boom cylinder, the load pressure of the arm cylinder, and the load pressure of the bucket cylinder exceeds a reference pressure, increase the supply of grease according as the load pressure increases.

SUMMARY

According to an aspect of the present invention, a shovel includes an undercarriage, an upper swing structure swingably attached to the undercarriage, and an automatic greaser mounted on the upper swing structure. The automatic greaser is configured to individually change the amount of grease fed to a first greasing point among multiple greasing points and the amount of grease fed to a second greasing point among the multiple greasing points based on information on the multiple greasing points.

BRIEF DESCRIPTION OF THE DRAWINGS

FIG. 1A is a side view of a shovel according to an embodiment of the present invention;

FIG. 1B is a diagram illustrating a structure around a rod-side link pin as viewed from below;

DETAILED DESCRIPTION

Figure 2:
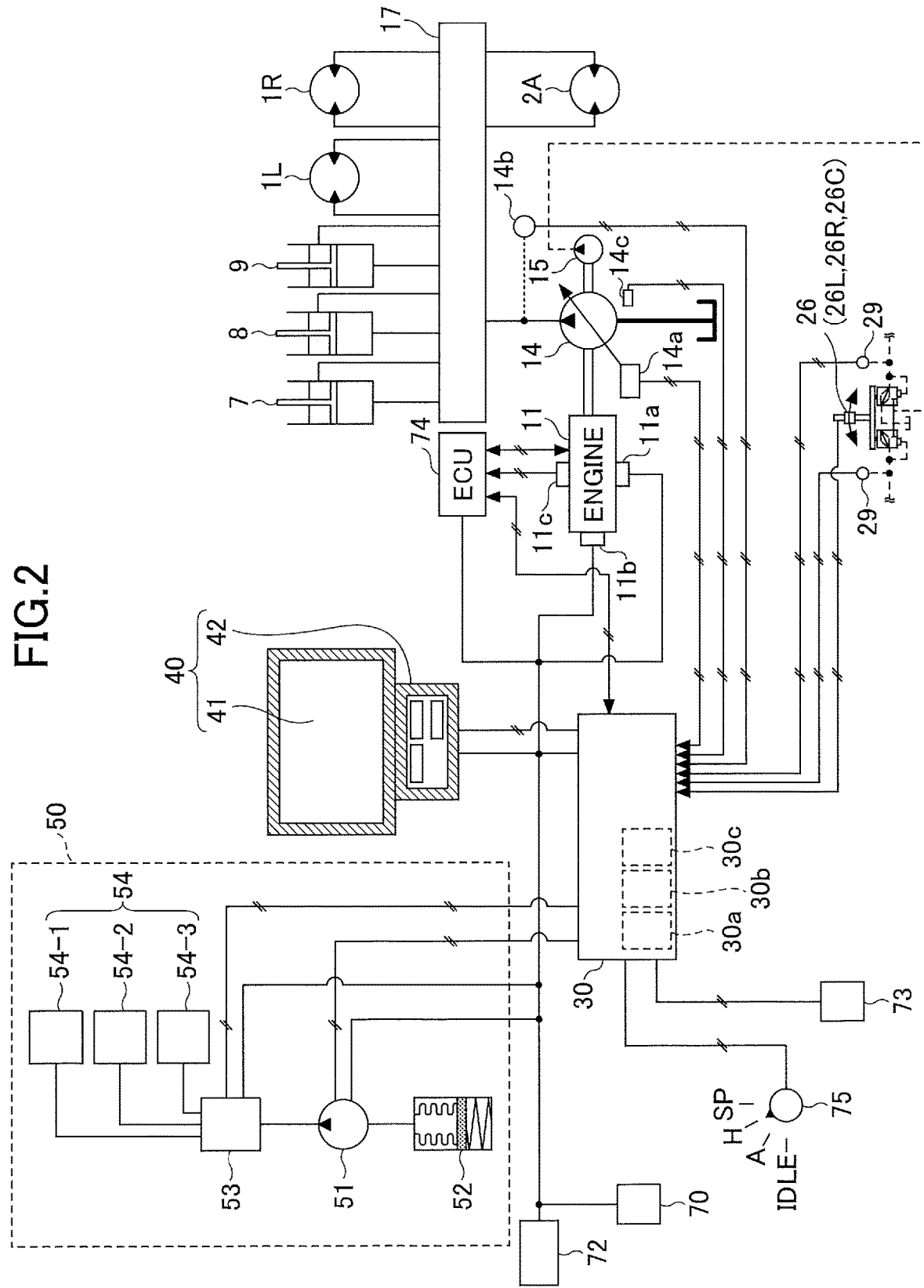
FIG. 2 is a diagram illustrating an example configuration of a basic system installed in the shovel of FIG. 1A.

The related-art automatic greaser, however, is configured to, when any of the load pressure of the boom cylinder, the load pressure of the arm cylinder, and the load pressure of the bucket cylinder exceeds a reference pressure, increase the supply of grease to all pin linking members. Therefore, the supply of grease to pin linking members with low friction as well is increased.

Therefore, it is desired to provide a shovel that can feed grease more appropriately.

According to an aspect of the present invention, a shovel that can feed grease more appropriately is provided.

FIG. 1A is a side view of a shovel according to an embodiment of the present invention. An upper swing structure 3 is swingably mounted on an undercarriage 1 of the shovel via a swing mechanism 2 serving as a work element. A boom 4 serving as a work element is attached to the upper swing structure 3. An arm 5 serving as a work element is attached to the distal end of the boom 4. A bucket 6 serving as a work element is attached to the distal end of the arm 5. The boom 4, the arm 5, and the bucket 6 constitute an excavation attachment serving as an example of an attachment, and are hydraulically driven by a boom cylinder 7, an arm cylinder 8, and a bucket cylinder 9, respectively.

A cabin 10 serving as a cab, an engine 11 serving as a drive source, an automatic greaser 50, etc., are mounted on the upper swing structure 3.

The automatic greaser 50 automatically feeds a lubricant such as grease to multiple greasing points. According to this embodiment, the greasing points include a ring GP1 of the swing mechanism 2, a boom foot pin GP2, an arm foot pin GP3, an arm top pin GP4, a bottom-side link pin GP5 and a rod-side link pin GP6 of the boom cylinder 7, a bottom-side link pin GP7 and a rod-side link pin GP8 of the arm cylinder 8, a bottom-side link pin GP9 and a rod-side link pin GP10 of the bucket cylinder 9, an arm-side link pin GP11 of a first bucket link 6A, and a bucket-side link pin GP12 of a second bucket link 6B. Furthermore, according to this embodiment, as illustrated in FIG. 1B, the greasing points for the rod-side link pin GP10 include three points: a right side GP10-LK of the rod-side link pin GP10 in the second bucket link 6B, a left side GP10-LK of the rod-side link pin GP10 in the second bucket link 6B, and a center GP10-CY of the rod-side link pin GP10 of the bucket cylinder 9. FIG. 1B illustrates a structure around the rod-side link pin GP10 as viewed from below.

Next, an example configuration of a basic system installed in the shovel of FIG. 1A is described with reference to FIG. 2. FIG. 2 illustrates an example configuration of the basic system. The basic system is constituted mainly of a controller 30, a display device 40, the automatic greaser 50, etc.

The controller 30 is a control device that controls various devices installed in the shovel. The controller 30 is composed of a processing unit including a CPU and an internal memory. The CPU executes programs stored in the internal memory to implement various functions of the controller 30.

The display device 40 displays a screen including various kinds of information in response to a command from the controller 30. The display device 40 is, for example, a liquid crystal display connected to the controller 30. The display device 40 is connected to the controller 30 via, for example, a communication network such as a CAN, a dedicated line, or the like. According to this embodiment, the display device 40 includes an image display part 41 and a switch panel 42. The switch panel 42 is a switch panel including various hardware switches.

The controller 30, the display device 40, the automatic greaser 50, etc., are supplied with electric power from a rechargeable battery 70 to operate. The rechargeable battery 70 is charged by a generator 11*a* driven by the engine 11. The electric power of the rechargeable battery 70 is also supplied to electrical equipment 72, a starter 11*b* of the engine 11, etc. The starter 11*b* is driven with electric power from the rechargeable battery 70 to start the engine 11.

The engine 11 is connected to a main pump 14 and a pilot pump 15 and controlled by an engine control unit (ECU) 74. The ECU 74 transmits various data indicating the condition of the engine 11 to the controller 30. The various data include, for example, data indicating coolant water temperature detected with a water temperature sensor 11*c*. The controller 30 stores these data in the internal memory and can display the data on the display device 40 at an appropriate time.

The main pump 14 supplies hydraulic oil to a control valve 17 via a hydraulic oil line. According to this embodiment, the main pump 14 is a swash plate variable displacement hydraulic pump, and the discharge flow rate is controlled by a regulator 14*a*. The regulator 14*a*, for example, increases or decreases the discharge flow rate of the main pump 14 in response to a command from the controller 30. The regulator 14*a* transmits data indicating a swash plate tilt angle to the controller 30. A discharge pressure sensor 14*b* transmits data indicating the discharge pressure of the main pump 14 to the controller 30. An oil temperature sensor 14*c* provided in a conduit between the main pump 14 and a tank storing hydraulic oil that the main pump 14 draws in transmits data representing the temperature of hydraulic oil flowing through the conduit to the controller 30.

The pilot pump 15 supplies hydraulic oil to various hydraulic control apparatus via a pilot line. The pilot pump 15 is, for example, a fixed displacement hydraulic pump.

The control valve 17 is a hydraulic controller that controls a hydraulic system installed in the shovel. The control valve 17 selectively supplies hydraulic oil discharged by the main pump 14 to, for example, a left travel hydraulic motor 1L, a right travel hydraulic motor 1R, a swing hydraulic motor 2A, the boom cylinder 7, the arm cylinder 8, the bucket cylinder 9, and the like (hereinafter collectively referred to as "hydraulic actuators").

An operating device 26 is used to operate the hydraulic actuators. According to this embodiment, the operating device 26 includes a left operating lever 26L, a right operating lever 26R, and a travel lever 26C. When the operating device 26 is operated, hydraulic oil is supplied from the pilot pump 15 to a pilot port of a flow control valve for a corresponding hydraulic actuator. Each pilot port is supplied with hydraulic oil of a pressure (pilot pressure) commensurate with the operation details (direction of operation and amount of operation) of the corresponding operating device 26.

An operating pressure sensor 29 detects a pilot pressure when the operating device 26 is operated, and transmits data indicating the detected pilot pressure to the controller 30. The controller 30 detects the operation details of the operating device 26 from the pilot pressure detected by the operating pressure sensor 29.

Next, functional elements of the controller 30 are described. The controller 30 includes a time obtaining part 30*a*, a greasing information obtaining part 30*b*, and a greasing control part 30*c* as functional elements.

The time obtaining part 30*a* is a functional element that obtains an elapsed time between two time points. According to this embodiment, the time obtaining part 30*a* can process a time exceeding 24 hours. The time obtaining part 30*a*, for example, obtains an elapsed time between a first time point and a second time point based on a GPS signal (time information including a week number) received via a GPS receiver at each of the first time point and the second time point. In this case, the time obtaining part 30*a* may derive the number of days elapsed between the first time point and the second time point. The time obtaining part 30*a* may receive signals from another device with at least one of a calendar function, a date managing function, etc., and derive an elapsed time (that may exceed 24 hours) between the first time point and the second time point.

The greasing information obtaining part 30*b* is a functional element that obtains information on multiple greasing points. According to this embodiment, the greasing information obtaining part 30*b* obtains information on multiple greasing points based on the outputs of an information obtaining device 73, an engine rotational speed adjustment dial 75, etc.

The information on multiple greasing points is at least one of information on the operating condition of multiple greasing points, information on the work environment of multiple greasing points, etc.

The infonuation obtaining device 73 detects information on the shovel. According to this embodiment, the information obtaining device 73 includes at least one of angle sensors (a boom angle sensor, an arm angle sensor, and a bucket angle sensor), a body tilt sensor, a swing angular velocity sensor, cylinder pressure sensors (a boom rod pressure sensor, a boom bottom pressure sensor, an arm rod pressure sensor, an arm bottom pressure sensor, a bucket rod pressure sensor, and a bucket bottom pressure sensor), cylinder stroke sensors (a boom cylinder stroke sensor, an arm cylinder stroke sensor, and a bucket cylinder stroke sensor), the discharge pressure sensor 14*b*, and the operating pressure sensor 29. The information obtaining device 73, for example, obtains, as shovel-related information, at least one of a boom angle, an arm angle, a bucket angle, a body tilt angle, a swing angular velocity, a boom rod pressure, a boom bottom pressure, an arm rod pressure, an arm bottom pressure, a bucket rod pressure, a bucket bottom pressure, a boom stroke amount, an arm stroke amount, a bucket stroke amount, the discharge pressure of the main pump 14, and the operating pressure of the operating device 26. The angle sensors may be constituted of a combination of an acceleration sensor and a gyroscope.

The information obtaining device 73 may include at least one of image sensors (for example, a monocular camera, a stereo camera, a thermographic sensor, and a distance image sensor) and distance sensors (for example, a laser range finder, a laser radar, a millimeter wave sensor, and an ultrasonic sensor).

The engine rotational speed adjustment dial 75 is a dial for adjusting the rotational speed of the engine 11, and, for example, can switch the engine rotational speed in a stepwise manner. According to this embodiment, the engine rotational speed adjustment dial 75 is so configured as to be able to select the engine rotational speed from among the four levels of SP mode, H mode, A mode, and idling mode. The engine rotational speed adjustment dial 75 transmits data indicating the setting of the engine rotational speed to the controller 30. FIG. 2 illustrates that the H-mode is selected by the engine rotational speed adjustment dial 75.

The SP mode is an engine mode selected when it is desired to prioritize workload, and uses the highest engine rotational speed. The H mode is an engine mode selected when it is desired to balance workload and fuel efficiency, and uses the second highest engine rotational speed. The A mode is an engine mode selected when it is desired to operate the shovel at low noise while prioritizing fuel efficiency, and uses the third highest engine rotational speed. The idling mode is an engine mode selected when it is desired to idle the engine 11, and uses the lowest engine rotational speed. The engine 11 is controlled to a constant rotational speed at the engine rotational speed of the rotational speed mode set by the engine rotational speed adjustment dial 75.

The greasing information obtaining part 30*b*, for example, determines the operating condition of multiple greasing points based on the respective movements of the boom 4, the arm 5, and the bucket 6. The respective movements of the boom 4, the arm 5, and the bucket 6 are, for example, detected based on the output of at least one of cylinder pressure sensors, operating pressure sensors, angle sensors, and cylinder stroke sensors.

The greasing information obtaining part 30*b*, for example, may determine the work environment of multiple greasing points based on the output of at least one of image sensors and distance sensors. The work environment is, for example, at least one of a work environment where a foreign object (water, mud, dust or the like) is likely to be mixed in a lubricant, a work environment where a lubricant is likely to dry, a work environment where a lubricant is likely to degrade, etc.

The greasing control part 30*c* is a functional element that controls the automatic greaser 50. According to this embodiment, the greasing control part 30*c* controls at least one of timing to start greasing by the automatic greaser 50, timing to end the greasing, etc., based on the outputs of the time obtaining part 30*a*, the greasing information obtaining part 30*b*, etc. The greasing control part 30*c* may select a greasing point and may change the ratio in which a lubricant is distributed among the greasing points on an as-needed basis. An operator, for example, may check the distribution ratio displayed on the display device 40 and then change the distribution ratio.

The automatic greaser 50 is constituted mainly of a grease pump 51, a grease tank 52, a solenoid valve 53, a distributor 54, etc.

The grease pump 51 is an example of a lubricant pump and pumps grease from the grease tank 52 to the distributor 54 via the solenoid valve 53. According to this embodiment, the grease pump 51 is an electric plunger pump of a fixed discharge quantity type with a piston and a cylinder. The grease pump 51, however, may alternatively be of a variable discharge quantity type. The piston is reciprocated by a cam mechanism driven by an electric motor. The controller 30 controls the electric motor to control the discharge of grease by the grease pump 51. The grease pump 51 may be a pump of another drive system such as a hydraulic system, a pneumatic system, or the like.

The grease tank 52 is a container for containing grease. According to this embodiment, the grease tank 52 is a container that accommodates a grease cartridge urged in a compression direction by a spring. Another container such as a pail may be used.

The solenoid valve 53 operates in response to a control command from the controller 30. According to this embodiment, the solenoid valve 53 is a selector valve with one inlet port and three outlet ports. The inlet port is connected to the discharge port of the grease pump 51. Each of the three outlet ports is connected to the distributor 54.

The distributor 54 is a device that distributes the grease pumped by the grease pump 51 to the greasing points. According to this embodiment, the distributor 54 includes a first distributor 54-1, a second distributor 54-2, and a third distributor 54-3.

The controller 30 switches the valve position of the solenoid valve 53 so that grease is pumped to one of the first distributor 54-1, the second distributor 54-2, and the third distributor 54-3. The controller 30 may also cause grease to be pumped to at least one of the first distributor 54-1, the second distributor 54-2, and the third distributor 54-3. The solenoid valve 53 has, for example, a first valve position that causes the inlet port to communicate with a first outlet port, a second valve position that causes the inlet port to communicate with a second outlet port, a third valve position that causes the inlet port to communicate with a third outlet port, and a fourth valve position that closes all the three outlet ports.

Figure 3:
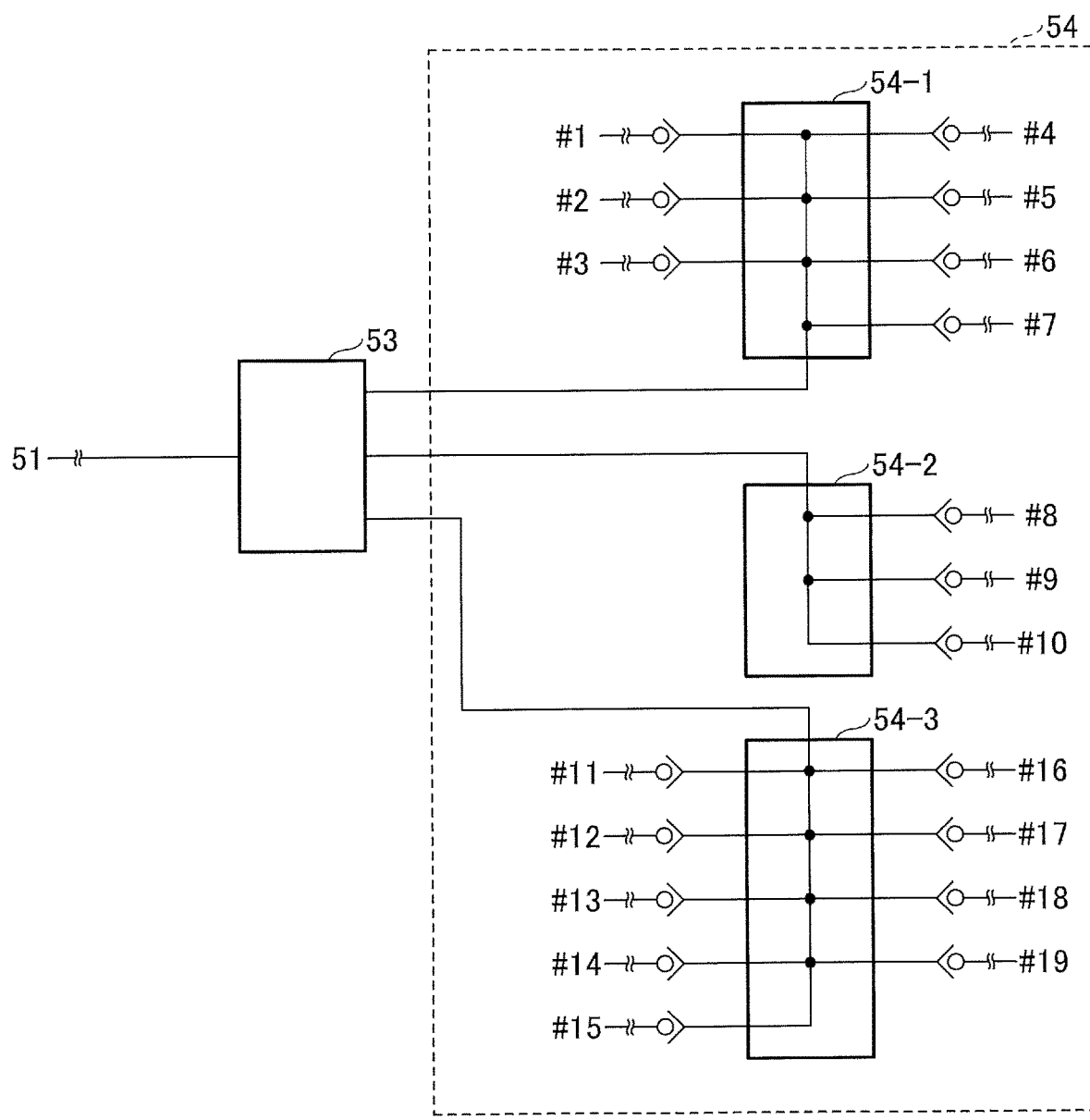
FIG. 3 is a diagram illustrating an example configuration of a distributor.

FIG. 3 illustrates an example configuration of the distributor 54. As illustrated in FIG. 3, the distributor 54 includes the first distributor 54-1, the second distributor 54-2, and the third distributor 54-3.

According to the example of FIG. 3, the first distributor 54-1 has one inlet port and seven outlet ports. A check valve is attached to a hose extending from each outlet port. A hose extending from the inlet port is connected to the first outlet port of the solenoid valve 53. The hoses extending from the seven outlet ports are connected to discharge ports placed at greasing points associated with the bucket 6. The first distributor 54-1 is configured to discharge the same amount of grease as received at the inlet port from each of the seven outlet ports in sequential order.

The second distributor 54-2 has one inlet port and three outlet ports. A check valve is attached to a hose extending from each outlet port. A hose extending from the inlet port is connected to the second outlet port of the solenoid valve 53. The hoses extending from the three outlet ports are connected to discharge ports placed at greasing points associated with the arm 5. The second distributor 54-2 is configured to discharge the same amount of grease as received at the inlet port from each of the three outlet ports in sequential order.

The third distributor 54-3 has one inlet port and nine outlet ports. A check valve is attached to a hose extending from each outlet port. A hose extending from the inlet port is connected to the third outlet port of the solenoid valve 53. The hoses extending from the nine outlet ports are connected to discharge ports placed at greasing points associated with the swing mechanism 2 and the boom 4. The third distributor 54-3 is configured to discharge the same amount of grease as received at the inlet port from each of the nine outlet ports in sequential order.

According to this configuration, the distributor 54 of FIG. 3 can feed grease to up to 19 greasing points. In FIG. 3, #1, #2 . . . #19 denote 19 greasing points. At least two of the 19 greasing points may be the same greasing point.

Table 1 illustrates an example of the correspondence relationship between greasing numbers and greasing points. According to this embodiment, as described above, greasing numbers #1 through #7 associated with the first distributor 54-1 are correlated with the discharge ports placed at the greasing points associated with the bucket 6, greasing numbers #8 through #10 associated with the second distributor 54-2 are correlated with the discharge ports placed at the greasing points associated with the arm 5, and greasing numbers #11 through #19 associated with the third distributor 54-3 are correlated with the discharge ports placed at the greasing points associated with the swing mechanism 2 and the boom 4. The number of greasing points associated with the bucket-side link pin GP12 corresponding to greasing number #1 is one for standard shovels, but is two for crane shovels.

TABLE 1

| Greasing Number | Greasing Point |
| --- | --- |
| #1 | BUCKET-SIDE LINK PIN GP12 OF SECOND BUCKET LINK 6B |
| #2 | ARM-SIDE LINK PIN GP11 OF FIRST BUCKET LINK 6A |
| #3 | RIGHT SIDE GP10-LK OF ROD-SIDE LINK PIN GP10 OF SECOND BUCKET LINK 6B |
| #4 | LEFT SIDE GP10-LK OF ROD-SIDE LINK PIN GP10 OF SECOND BUCKET LINK 6B |
| #5 | BOTTOM-SIDE LINK PIN GP9 OF BUCKET CYLINDER 9 |
| #6 | CENTER GP10-CY OF ROD-SIDE LINK PIN GP10 OF BUCKET CYLINDER 9 |
| #7 | ARM TOP PIN GP4 |
| #8 | ARM FOOT PIN GP3 |
| #9 | BOTTOM-SIDE LINK PIN GP7 OF ARM CYLINDER 8 |
| #10 | ROD-SIDE LINK PIN GP8 OF ARM CYLINDER 8 |
| #11 | RIGHT SIDE OF BOOM FOOT PIN GP2 |
| #12 | LEFT SIDE OF BOOM FOOT PIN GP2 |
| #13 | RIGHT SIDE OF BOTTOM-SIDE LINK PIN GP5 OF BOOM CYLINDER 7 |
| #14 | LEFT SIDE OF BOTTOM-SIDE LINK PIN GP5 OF BOOM CYLINDER 7 |
| #15 | RIGHT SIDE OF ROD-SIDE LINK PIN GP6 OF BOOM CYLINDER 7 |
| #16 | LEFT SIDE OF ROD-SIDE LINK PIN GP6 OF BOOM CYLINDER 7 |
| #17 | FRONT SIDE OF RING GP1 OF SWING MECHANISM 2 |
| #18 | REAR SIDE OF RING GP1 OF SWING MECHANISM 2 |
| #19 | PINION GEAR OF SWING HYDRAULIC MOTOR 2A |

Figure 4:
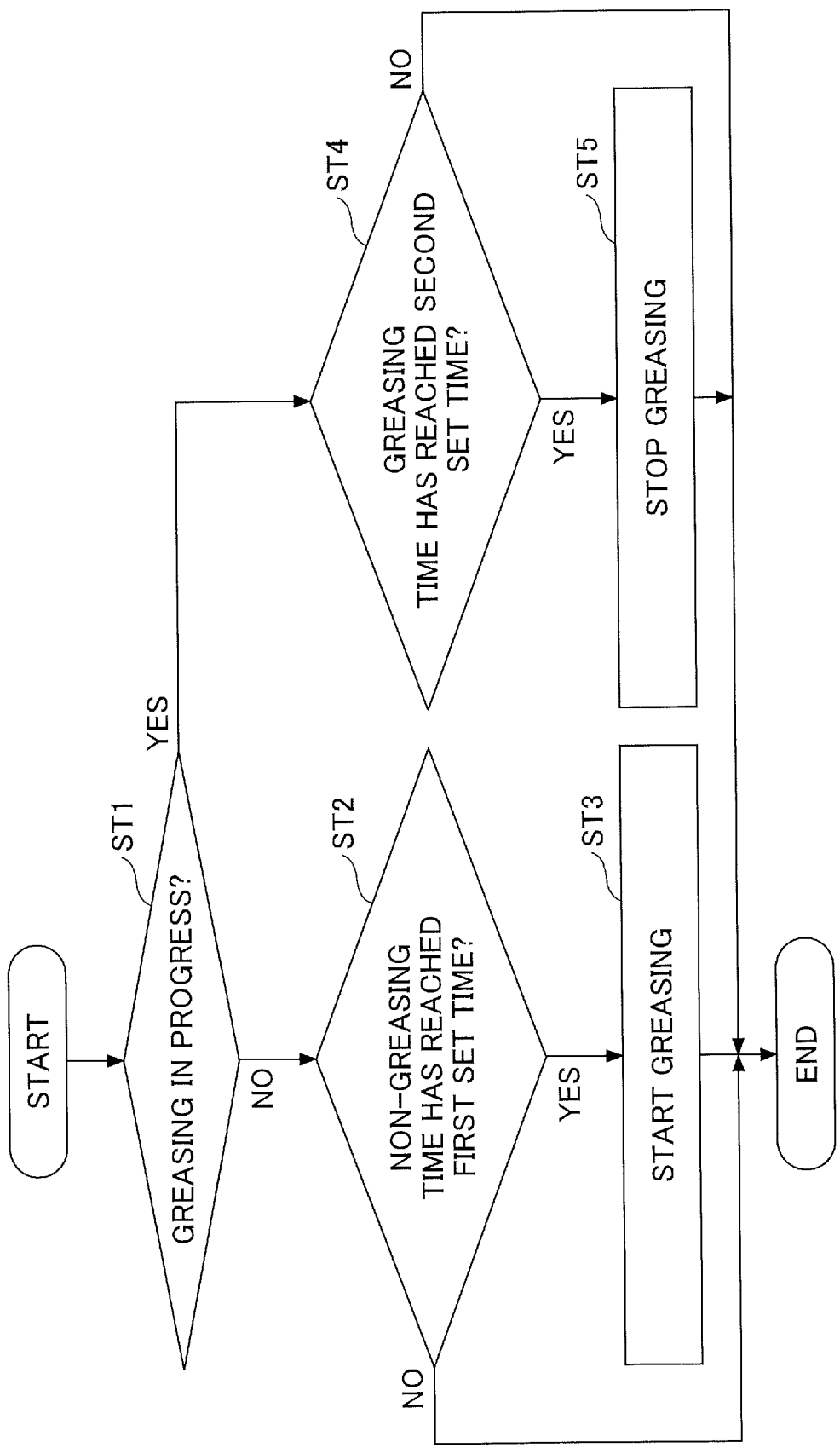
FIG. 4 is a flowchart of a greasing process.

Next, a process of the greasing control part 30c starting or stopping greasing by the automatic greaser 50 (hereinafter "greasing process") is described with reference to FIG. 4. FIG. 4 is a flowchart of the greasing process. The greasing control part 30c, for example, repeatedly executes this greasing process at predetermined control intervals while the controller 30 is being activated.

When the greasing process is started with the activation of the controller 30, first, the greasing control part 30c determines whether greasing is in progress (step ST1). According to this embodiment, the greasing control part 30c refers to the value of a greasing flag stored in the internal memory, and determines whether greasing is in progress. The greasing control part 30c, for example, sets the value of the greasing flag to "1" (a value indicating that "greasing is in progress") when outputting a greasing start command to the automatic greaser 50, and sets the value of the greasing flag to "0" (a value indicating that "greasing is not in progress") when outputting a greasing stop command to the automatic greaser 50. The greasing control part 30c may receive the output signal of the automatic greaser 50 to determine whether greasing is in progress.

In response to determining that greasing is not in progress (NO at step ST1), the greasing control part 30c determines whether a non-greasing time has reached a first set time (step ST2). The "non-greasing time" means the duration of non-greasing state in which no greasing is performed by the automatic greaser 50. For example, the greasing control part 30c starts measuring the non-greasing time when outputting a greasing stop command to the automatic greaser 50. The greasing control part 30c monitors the duration of the non-greasing state based on the time elapsed since the output of the greasing stop command obtained by the time obtaining part 30a. The first set time serving as settings information is a target time for continuing the non-greasing state, and is, for example, 30 minutes. Hereinafter, the first set time is also referred to as greasing interval.

In response to determining that the non-greasing time has reached the first set time (YES at step ST2), the greasing control part 30c starts greasing by the automatic greaser 50 (step ST3). The greasing control part 30c, for example, outputs a greasing start command to the automatic greaser 50. Specifically, the greasing control part 30c outputs a drive start command to the grease pump 51, and outputs a valve control command to the solenoid valve 53. The valve control command to the solenoid valve 53 is, for example, a command for implementing a desired valve position. In this case, the greasing start command means a combination of the drive start command and the valve control command.

In response to determining that the non-greasing time has not reached the first set time (NO at step ST2), the greasing control part 30c ends the greasing process of this time without starting greasing by the automatic greaser 50.

In response to determining at step ST1 that greasing is in progress (YES at step ST1), the greasing control part 30c determines whether a greasing time has reached a second set time (step ST4). The "greasing time" means the duration of greasing state in which greasing is performed by the automatic greaser 50. The greasing control part 30c, for example, starts measuring the greasing time when outputting a greasing start command to the automatic greaser 50. The greasing control part 30c monitors the duration of the greasing state based on the time elapsed since the output of the greasing start command obtained by the time obtaining part 30a. The second set time serving as settings information is a target time for continuing the greasing state, and is, for example, 5 minutes (300 seconds).

According to this embodiment, the greasing control part 30c controls the automatic greaser 50 such that grease is pumped from the grease pump 51 to the first distributor 54-1 for 50% of the second set time, grease is pumped from the grease pump 51 to the second distributor 54-2 for 20% of the second set time, and grease is pumped from the grease pump 51 to the third distributor 54-3 for 30% of the second set time. Hereinafter, the distribution ratio achieved by this control is represented as "distribution ratio 50:20:30." Specifically, of the second set time (300 seconds), 50% (150 seconds) is allotted for feeding grease to the first distributor 54-1, 20% (60 seconds) is allotted for feeding grease to the second distributor 54-2, and 30% (90 seconds) is allotted for feeding grease to the third distributor 54-3. The feeding of grease to the first distributor 54-1 is typically performed for 150 consecutive seconds, but may also be performed in three separate times each for 50 seconds, for example. That is, the time of feeding grease to the first distributor 54-1 is satisfactory as long as it is 150 seconds in total. The same is the case with the time of feeding grease to the second distributor 54-2 and the third distributor 54-3.

In response to determining that the greasing time has reached the second set time (YES at step ST4), the greasing control part 30c stops greasing by the automatic greaser 50 (step ST5). The greasing control part 30c, for example, outputs a greasing stop command to the automatic greaser 50. Specifically, the greasing control part 30c outputs a drive stop command to the grease pump 51, and outputs a valve control command to the solenoid valve 53. The valve control command to the solenoid valve 53 is, for example, a command for implementing the fourth valve position that closes all the outlet ports. In this case, the greasing stop command means a combination of the drive stop command and the valve control command.

In response to determining that the greasing time has not reached the second set time (NO at step ST4), the greasing control part 30c ends the greasing process of this time without stopping greasing by the automatic greaser 50.

According to the above-described configuration, the greasing control part 30c can alternately achieve the non-greasing state that continues for the first set time and the greasing state that continues for the second set time. That is, when the elapsed time since ending greasing reaches a predetermined time, the next greasing is started. This elapsed time basically does not include an elapsed time during which the engine 11 is stopped. The elapsed time, however, may include an elapsed time during which the engine 11 is stopped.

Figure 5:
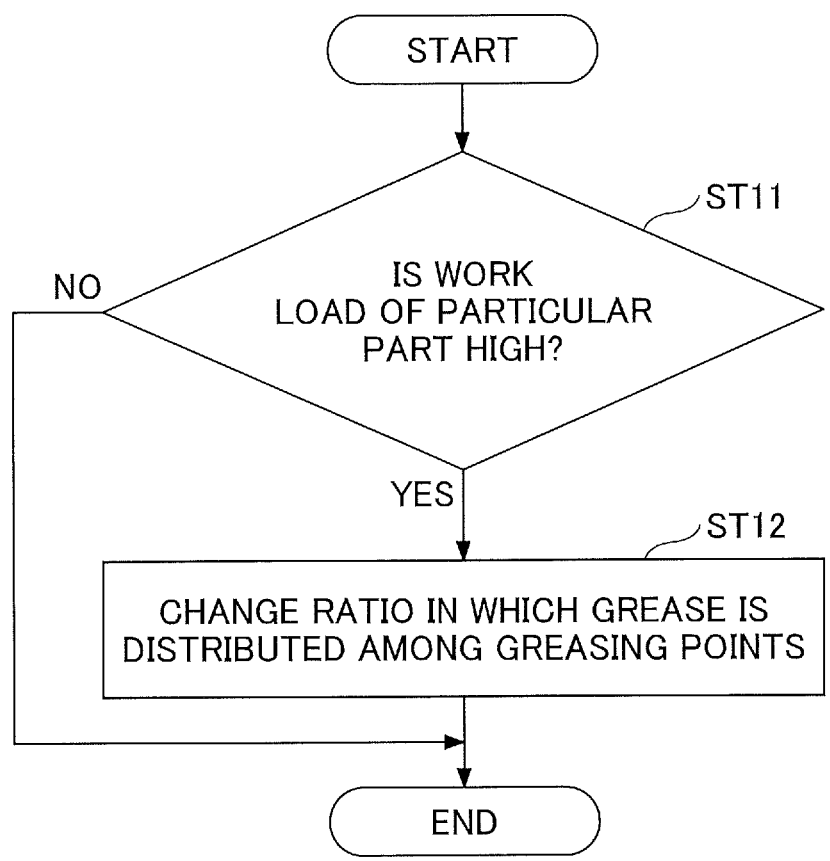
FIG. 5 is a flowchart of an example of a distribution ratio changing process.

Next, an example of a process of the greasing control part 30c changing the ratio in which grease is distributed among greasing points (hereinafter "distribution ratio changing process") is described with reference to FIG. 5. FIG. 5 is a flowchart of an example of the distribution ratio changing process. The greasing control part 30c, for example, executes this distribution ratio changing process when starting greasing by the automatic greaser 50.

First, the greasing control part 30c of the controller 30 determines whether the work load of a particular part is high (step ST11). The particular part is, for example, at least one of a boom-related part, an arm-related part, a bucket-related part, a swing mechanism-related part, etc. The work load is an example of operating condition information, and according to this embodiment, is expressed as being high or not high. According to this embodiment, the bucket-related part is a part related to the greasing points greased through the first distributor 54-1. The arm-related part is a part related to the greasing points greased through the second distributor 54-2. The boom-related part and the swing mechanism-related part are parts related to the greasing points greased through the third distributor 54-3.

According to this embodiment, the greasing control part 30c determines whether the work load of a particular part is high, referring to the value of a high load flag stored in the internal memory. The high load flag may include multiple high load flags corresponding to the individual particular parts, such as a boom high load flag, an arm high load flag, a bucket high load flag, and a swing high load flag or may be a single high load flag representing whether the work load of any of the particular parts is high.

In response to determining that the work load of a particular part is high, the controller 30 sets the value of the high load flag to "1." Specifically, the controller 30, for example, determines whether the work load of a particular part is high during the latest non-greasing time based on the output of the information obtaining device 73. For example, the greasing control part 30c determines that the work load of the boom-related part is high and sets the value of the boom high load flag to "1" in response to determining that the total operation time of a boom operating lever during the non-greasing time is more than or equal to a predetermined value based on the output of the operating pressure sensor 29.

The controller 30, for example, may also determine that the work load of the boom-related part is high and set the value of the boom high load flag to "1" in response to determining that the total amount of movement of the boom 4 during the non-greasing time is more than or equal to a predetermined value based on the output of the boom angle sensor. The total amount of movement of the boom 4 is, for example, the sum of the total amount of upward movement and the total amount of downward movement, and may be expressed as a rotation angle.

The controller 30, for example, may also determine that the work load of the boom-related part is high and set the value of the boom high load flag to "1" in response to determining that the total amount of extension and retraction (the sum of the total amount of extension and the total amount of retraction) of the boom cylinder 7 during the non-greasing time is more than or equal to a predetermined value based on the output of the boom cylinder stroke sensor.

The controller 30, for example, may also determine that the work load of the boom-related part is high and set the value of the boom high load flag to "1" in response to determining that the cumulative value of a pin surface pressure acting on the boom foot pin during the non-greasing time is more than or equal to a predetermined value based on the output of the boom bottom pressure sensor.

The controller 30, for example, may also determine that the work load of the boom-related part is high and set the value of the boom high load flag to "1" in response to determining that the cumulative value of a PV value related to the boom foot pin during the non-greasing time is more than or equal to a predetermined value based on the outputs of the boom angle sensor and the boom bottom pressure sensor. The PV value is expressed as a product of a pin surface pressure acting on the boom foot pin and the total amount of movement of the boom 4.

The controller 30, for example, may also determine that the work load of the bucket-related part is high and set the value of the bucket high load flag to "1" in response to determining that the work environment is likely to allow mixture of a foreign object (such as water, mud or dust) into the bucket-related part based on an image of a target of work (such as the ground) output by an image sensor attached to the upper swing structure 3.

The controller 30, for example, may also determine that the work load of the boom-related part is high and set the value of the boom high load flag to "1" in response to determining that the temperature of the boom foot pin is more than or equal to a predetermined value based on a thermal image output by a thermographic sensor attached to the upper swing structure 3.

The controller 30, for example, may also determine that the work load of the bucket-related part is high and set the value of the bucket high load flag to "1" in response to determining that the bucket 6 is roughly operated, for example, the bucket 6 is slammed on the ground, that is, in response to determining that the bucket 6 is roughly handled, during the non-greasing time, based on the output of an acceleration sensor attached to the bucket 6.

In response to determining that the work load of a particular part is high (YES at step ST11), the greasing control part 30c of the controller 30 changes the ratio in which grease is distributed among greasing points (step ST12).

For example, the greasing control part 30c changes the ratio in which grease is distributed among greasing points if the value of any of the high load flags is "1." The greasing control part 30c changes the ratio in which grease is distributed among greasing points by changing grease distribution time for each of the three distributors 54 without changing the first set time that is a target time for continuing non-greasing state and the second set time that is a target time for continuing greasing state.

For example, in response to determining that the work load of the bucket-related part is high, the greasing control part 30c changes the initial distribution ratio 50:20:30 to the distribution ratio 75:5:20. That is, the greasing control part 30c changes the setting in which grease is pumped from the grease pump 51 to the first distributor 54-1 for 50% of the second set time to the setting in which grease is pumped from the grease pump 51 to the first distributor 54-1 for 75% of the second set time. Meanwhile, the greasing control part 30c changes the setting in which grease is pumped from the grease pump 51 to the second distributor 54-2 for 20% of the second set time to the setting in which grease is pumped from the grease pump 51 to the second distributor 54-2 for 5% of the second set time. Furthermore, the greasing control part 30c changes the setting in which grease is pumped from the grease pump 51 to the third distributor 54-3 for 30% of the second set time to the setting in which grease is pumped from the grease pump 51 to the third distributor 54-3 for 20% of the second set time.

Specifically, the setting in which, of the second set time (300 seconds), 150 seconds are allotted for feeding grease to the first distributor 54-1, 60 seconds are allotted for feeding grease to the second distributor 54-2, and 90 seconds are allotted for feeding grease to the third distributor 54-3 is changed to the setting in which, of the second set time (300 seconds), 225 seconds are allotted for feeding grease to the first distributor 54-1, 15 seconds are allotted for feeding grease to the second distributor 54-2, and 60 seconds are allotted for feeding grease to the third distributor 54-3.

The greasing control part 30c, however, may increase or decrease at least one of the first set time and the second set time and then change the ratio in which grease is distributed among greasing points. In this case, the greasing control part 30c may increase or decrease the amount of distribution while maintaining the distribution ratio.

Furthermore, the greasing control part 30c may determine the changed distribution ratio according to the total operation time of each particular part, the total amount of movement of each work element, the total amount of extension and retraction of each hydraulic cylinder, the cumulative value of the pin surface pressure or PV value of each pin, the work environment of each particular part, the temperature of each pin, how each work element is handled, or the like.

The greasing control part 30c may also determine the changed distribution ratio based on the current work mode of the shovel. According to this embodiment, the work mode includes a normal mode (excavation mode) and a crane mode, and is switched using a switch installed in the cabin 10. The work mode may also include at least one of a lifting magnet mode and a harvester mode (forestry mode).

Figure 6:
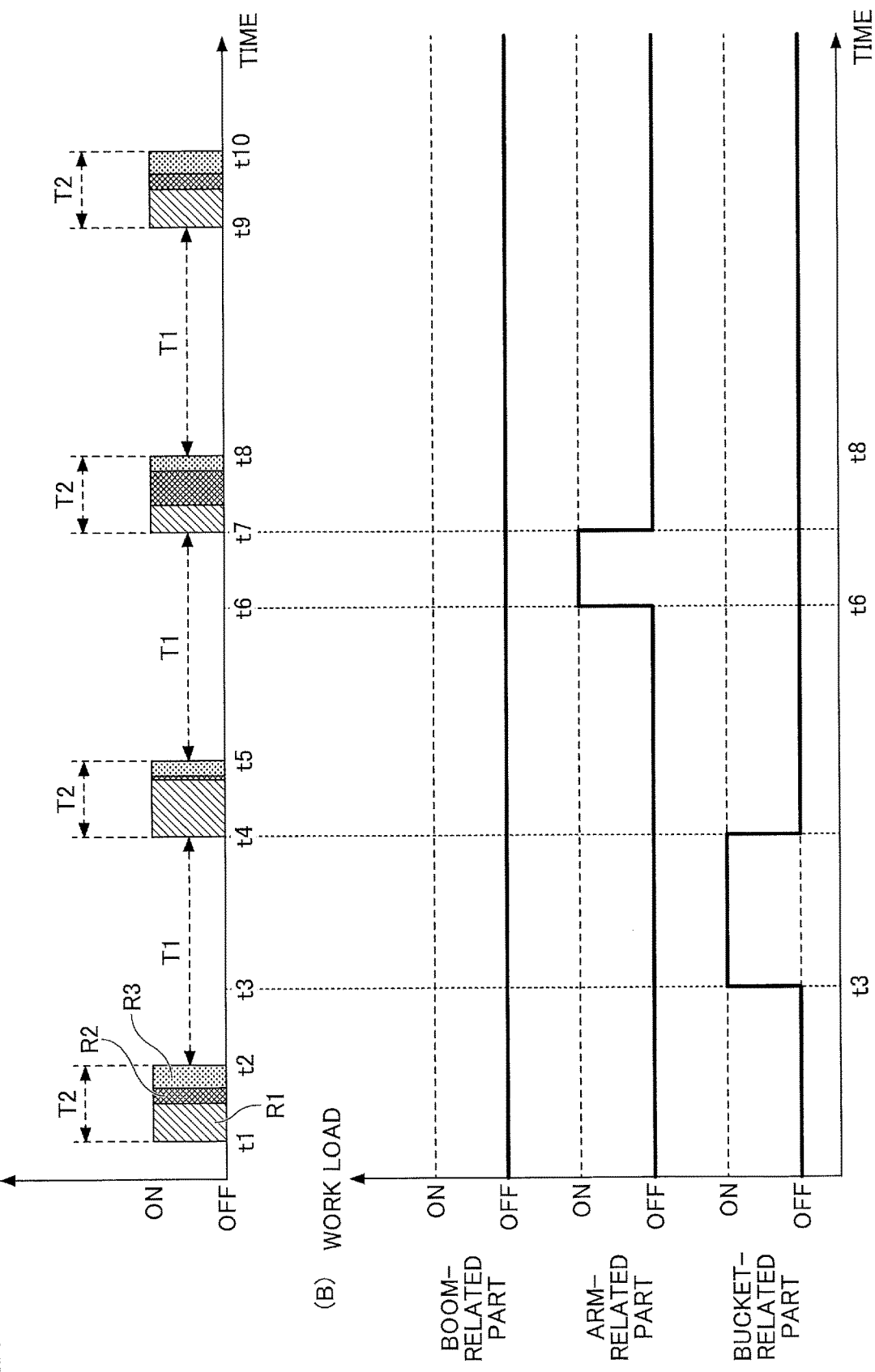
FIG. 6 illustrates changes in the ratio in which grease is distributed among greasing points.

Next, a change in the ratio in which grease is distributed among greasing points is described with reference to FIG. 6. In FIG. 6, (A) illustrates a temporal transition of greasing state and non-greasing state. On the vertical axis, "ON" represents greasing state and "OFF" represents non-greasing state. The horizontal axis represents the passage of time. In FIG. 6, (B) illustrates a temporal transition of high-load state (where a work load is high) and non-high-load state (where a work load is not high) with respect to each of the boom-related part, the arm-related part, and the bucket-related part. On the vertical axis, "ON" represents high-load state and "OFF" represents "non-high-load state." The horizontal axis represents the passage of time and corresponds to the horizontal axis of (A) of FIG. 6.

In FIG. 6, (A) illustrates that the non-greasing state that continues for a first set time T1 and the greasing state that continues for a second set time T2 are alternately repeated. Furthermore, (A) of FIG. 6 also illustrates that the second set time T2 includes a period R1 during which greasing is performed via the first distributor 54-1, a period R2 during which greasing is performed via the second distributor 54-2, and a period R3 during which greasing is performed via the third distributor 54-3. Based on these, (A) of FIG. 6 illustrates that the ratio in which grease is distributed among greasing points changes when it is determined that the work load of a particular part is high.

Specifically, when the non-greasing time reaches the first set time T1 at time t1, the greasing control part 30c starts greasing over the second set time T2. At this point, the greasing control part 30c executes the distribution ratio changing process.

According to this embodiment, the greasing control part 30c refers to the value of a high load flag stored in the internal memory. In response to determining that none of the boom-related part, the arm-related part, and the bucket-related part is in high-load state during the latest non-greasing state over the first set time T1, the greasing control part 30c sets the ratio in which grease is distributed among greasing points to initial state (the distribution ratio 50:20:30).

In this case, the greasing control part 30c performs greasing via the first distributor 54-1 during the period R1 corresponding to 50% of the second set time T2, performs greasing via the second distributor 54-2 during the period R2 corresponding to 20% of the second set time T2, and performs greasing via the third distributor 54-3 during the period R3 corresponding to 30% of the second set time T2.

Thereafter, when the greasing time reaches the second set time T2 at time t2, the greasing control part 30c stops greasing.

Thereafter, at time t3, the controller 30 determines that the work load of the bucket-related part is high. For example, the controller 30 determines that the work load of the bucket-related part is high in response to determining that the total operation time of a bucket operating lever during the non-greasing time that has started at time t2 is more than or equal to a predetermined value.

Specifically, the controller 30, for example, sets the value of the bucket high load flag to "1" in response to determining that the work load of the bucket-related part is high. The same is the case with other parts such as the boom-related part and the arm-related part.

Thereafter, when the non-greasing time reaches the first set time T1 at time t4, the greasing control part 30c resumes greasing. At this point, the greasing control part 30c executes the distribution ratio changing process.

At this point, the greasing control part 30c refers to the value of the bucket high load flag, and in response to determining that the bucket-related part is in high-load state during the latest non-greasing state over the first set time T1, changes the ratio in which grease is distributed among greasing points to 75:5:20. Furtheurtore, the greasing control part 30c resets the value of the bucket high load flag to "0" when starting greasing.

In this case, the greasing control part 30c performs greasing via the first distributor 54-1 during a period corresponding to 75% of the second set time T2, performs greasing via the second distributor 54-2 during a period corresponding to 5% of the second set time T2, and performs greasing via the third distributor 54-3 during a period corresponding to 20% of the second set time T2.

Thereafter, when the greasing time reaches the second set time T2 at time t5, the greasing control part 30c stops greasing.

Thereafter, at time t6, the controller 30 determines that the work load of the arm-related part is high. For example, the controller 30 determines that the work load of the arm-related part is high in response to determining that the total amount of movement of the arm 5 during the non-greasing time that has started at time t5 is more than or equal to a predetermined value.

Specifically, the controller 30, for example, sets the value of the arm high load flag to "1" in response to determining that the work load of the arm-related part is high.

Thereafter, when the non-greasing time reaches the first set time T1 at time t7, the greasing control part 30c resumes greasing. At this point, the greasing control part 30c executes the distribution ratio changing process.

At this point, the greasing control part 30c refers to the value of the arm high load flag, and in response to determining that the arm-related part is in high-load state during the latest non-greasing state over the first set time T1, the greasing control part 30c changes the ratio in which grease is distributed among greasing points to 35:45:20. Furthermore, the greasing control part 30c resets the value of the arm high load flag to "0" when starting greasing.

In this case, the greasing control part 30c performs greasing via the first distributor 54-1 during a period corresponding to 35% of the second set time T2, performs greasing via the second distributor 54-2 during a period corresponding to 45% of the second set time T2, and performs greasing via the third distributor 54-3 during a period corresponding to 20% of the second set time T2.

Thereafter, when the greasing time reaches the second set time T2 at time t8, the greasing control part 30c stops greasing.

Thereafter, when the non-greasing time reaches the first set time T1 at time t9, the greasing control part 30c resumes greasing. At this point, the greasing control part 30c executes the distribution ratio changing process.

Specifically, the greasing control part 30c refers to the value of the high load flag, and in response to determining that none of the boom-related part, the airti-related part, and the bucket-related part is in high-load state during the latest non-greasing state over the first set time T2, the greasing control part 30c sets the ratio in which grease is distributed among greasing points to initial state (the distribution ratio 50:20:30).

In this case, the greasing control part 30c performs greasing via the first distributor 54-1 during a period corresponding to 50% of the second set time T2, performs greasing via the second distributor 54-2 during a period corresponding to 20% of the second set time T2, and performs greasing via the third distributor 54-3 during a period corresponding to 30% of the second set time T2.

Thereafter, when the greasing time reaches the second set time T2 at time t10, the greasing control part 30c stops greasing.

Figure 7:
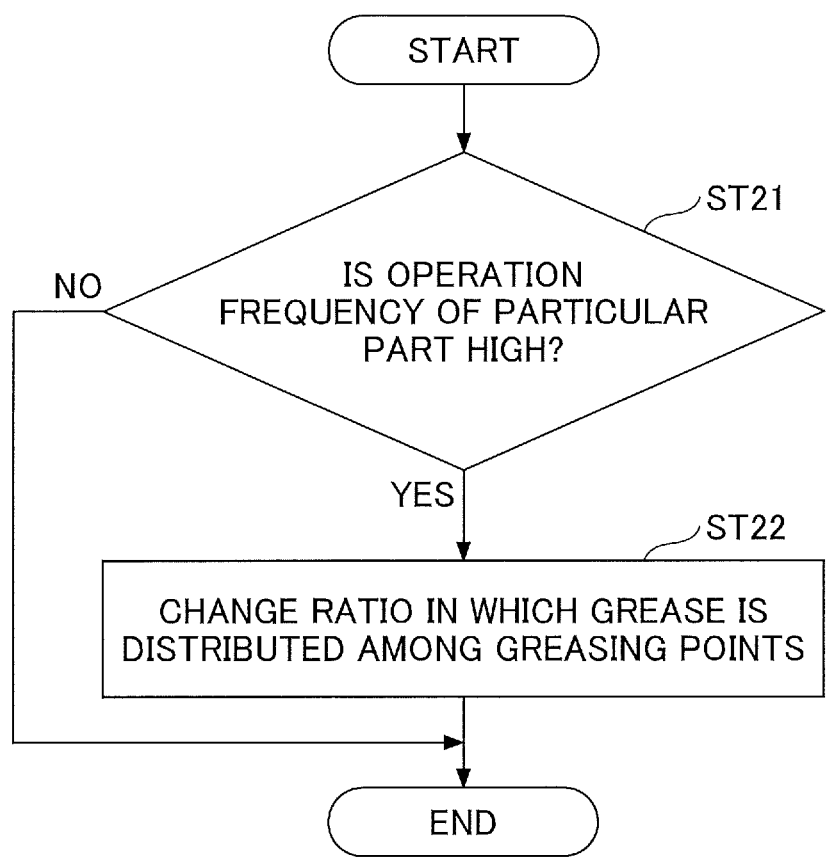
FIG. 7 is a flowchart of another example of the distribution ratio changing process.

Next, another example of the distribution ratio changing process is described with reference to FIG. 7. FIG. 7 is a flowchart of another example of the distribution ratio changing process. The greasing control part 30c, for example, executes this distribution ratio changing process when starting greasing by the automatic greaser 50.

First, the controller 30 determines whether the operation frequency of a particular part is high (step ST21). The operation frequency is an example of operating condition information, and according to this embodiment, is expressed as being high or not high.

According to this embodiment, the greasing control part 30c determines whether the operation frequency of a particular part is high, referring to the value of a high frequency flag stored in the internal memory. The high frequency flag may include multiple high frequency flags corresponding to the individual particular parts, such as a boom high frequency flag, an arm high frequency flag, a bucket high frequency flag, and a swing high frequency flag or may be a single high frequency flag representing whether the operation frequency of any of the particular parts is high.

The controller 30, for example, counts the number of times a hydraulic actuator operates based on the output of the operating pressure sensor 29. Specifically, the controller 30 counts the number of times of operation of each of the swing hydraulic motor 2A, the boom cylinder 7, the arm cylinder 8, and the bucket cylinder 9 individually. The controller 30, for example, determines that the operation frequency of the boom-related part is high when the number of times of operation of the boom cylinder 7 is more than or equal to a predetermined value. The same is the case with other particular parts. In response to determining that the operation frequency of a particular part is high, the controller 30 sets the value of the high frequency flag to "1."

In response to determining that the operation frequency of a particular part is high (YES at step ST21), the greasing control part 30c changes the ratio in which grease is distributed among greasing points (step ST22).

For example, the greasing control part 30c changes the ratio in which grease is distributed among greasing points if the value of any of the high frequency flags is "1." The greasing control part 30c changes the ratio in which grease is distributed among greasing points by changing grease distribution time for each of the three distributors 54 without changing the first set time that is a target time for continuing non-greasing state and the second set time that is a target time for continuing greasing state.

For example, in response to determining that the operation frequency of the bucket-related part is high, the greasing control part 30c changes the initial distribution ratio 50:20:30 to the distribution ratio 75:5:20.

The greasing control part 30c, however, may increase or decrease at least one of the first set time and the second set time and then change the ratio in which grease is distributed among greasing points. In this case, the greasing control part 30c may increase or decrease the amount of distribution while maintaining the distribution ratio.

Figure 8:
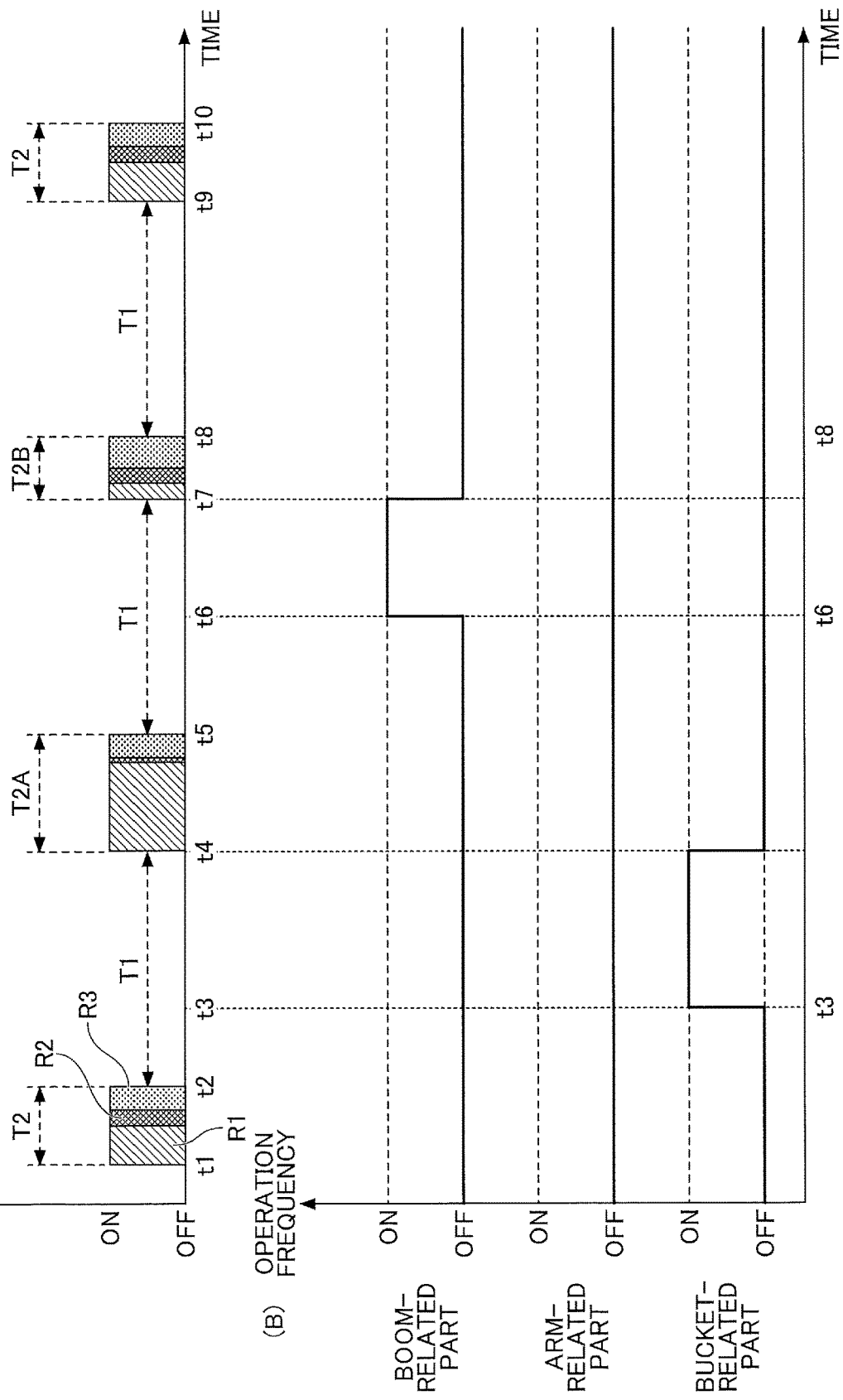
FIG. 8 illustrates changes in the ratio in which grease is distributed among greasing points.

Next, a change in the ratio in which grease is distributed among greasing points is described with reference to FIG. 8. In FIG. 8, (A) illustrates a temporal transition of greasing state and non-greasing state. On the vertical axis, "ON" represents greasing state and "OFF" represents non-greasing state. The horizontal axis represents the passage of time. In FIG. 8, (B) illustrates a temporal transition of high-frequency state (where operation frequency is high) and non-high-frequency state (where operation frequency is not high) with respect to each of the boom-related part, the arm-related part, and the bucket-related part. On the vertical axis, "ON" represents high-frequency state and "OFF" represents "non-high-frequency state." The horizontal axis represents the passage of time and corresponds to the horizontal axis of (A) of FIG. 8.

In FIG. 8, (A) illustrates that the non-greasing state that continues for a first set time T1 and the greasing state that continues for a second set time T2 are alternately repeated.

Furthermore, (A) of FIG. 8 also illustrates that the second set time T2 includes the period R1 during which greasing is performed via the first distributor 54-1, the period R2 during which greasing is performed via the second distributor 54-2, and the period R3 during which greasing is performed via the third distributor 54-3. Based on these, (A) of FIG. 8 illustrates that the ratio in which grease is distributed among greasing points changes when it is determined that the operation frequency of a particular part is high.

When the non-greasing time reaches the first set time T1 at time t1, the greasing control part 30c starts greasing over the second set time T2. At this point, the greasing control part 30c executes the distribution ratio changing process of FIG. 7.

According to this embodiment, the greasing control part 30c refers to the value of a high load flag stored in the internal memory, and in response to determining that none of the boom-related part, the aim-related part, and the bucket-related part is in high-frequency state during the latest non-greasing state over the first set time T1, sets the ratio in which grease is distributed among greasing points to initial state (the distribution ratio 50:20:30).

In this case, the greasing control part 30c performs greasing via the first distributor 54-1 during the period R1 corresponding to 50% of the second set time T2, performs greasing via the second distributor 54-2 during the period R2 corresponding to 20% of the second set time T2, and performs greasing via the third distributor 54-3 during the period R3 corresponding to 30% of the second set time T2.

Thereafter, when the greasing time reaches the second set time T2 at time t2, the greasing control part 30c stops greasing.

Thereafter, at time t3, the controller 30 determines that the operation frequency of the bucket-related part is high. For example, the controller 30 determines that the operation frequency of the bucket-related part is high in response to determining that the number of times of operation of the bucket cylinder 9 during the non-greasing time that has started at time t2 is more than or equal to a predetermined value.

Specifically, the controller 30, for example, sets the value of the bucket high frequency flag to "1" in response to detenuining that the operation frequency of the bucket-related part is high. The same is the case with other parts such as the boom-related part and the aim-related part.

Thereafter, when the non-greasing time reaches the first set time T1 at time t4, the greasing control part 30c resumes greasing. At this point, the greasing control part 30c executes the distribution ratio changing process of FIG. 7.

Specifically, the greasing control part 30c refers to the value of the bucket high frequency flag, and in response to determining that the bucket-related part is in high-frequency state during the latest non-greasing state over the first set time T1, extends the second set time T2 to a second set time T2A and changes the ratio in which grease is distributed among greasing points to 75:5:20. Furthermore, the greasing control part 30c resets the value of the bucket high frequency flag to "0" when starting greasing.

In this case, the greasing control part 30c performs greasing via the first distributor 54-1 during a period corresponding to 75% of the second set time T2A, performs greasing via the second distributor 54-2 during a period corresponding to 5% of the second set time T2A, and performs greasing via the third distributor 54-3 during a period corresponding to 20% of the second set time T2A.

Thereafter, when the greasing time reaches the second set time T2A at time t5, the greasing control part 30c stops greasing.

Thereafter, at time t6, the controller 30 determines that the operation frequency of the boom-related part is high. For example, the controller 30 determines that the operation frequency of the boom-related part is high in response to determining that the number of times of operation of the boom cylinder 7 during the non-greasing time that has started at time t5 is more than or equal to a predetermined value.

Specifically, the controller 30, for example, sets the value of the boom high frequency flag to "1" in response to determining that the operation frequency of the boom-related part is high.

Thereafter, when the non-greasing time reaches the first set time T1 at time t7, the greasing control part 30c resumes greasing. At this point, the greasing control part 30c executes the distribution ratio changing process of FIG. 7.

Specifically, the greasing control part 30c refers to the value of the boom high frequency flag, and in response to determining that the boom-related part is in high-frequency state during the latest non-greasing state over the first set time T1, the greasing control part 30c shortens the second set time T2 to a second set time T2B (<T2) and changes the ratio in which grease is distributed among greasing points to 25:25:50. Furthermore, the greasing control part 30c resets the value of the boom high frequency flag to "0" when starting greasing.

In this case, the greasing control part 30c performs greasing via the first distributor 54-1 during a period corresponding to 25% of the second set time T2B, performs greasing via the second distributor 54-2 during a period corresponding to 25% of the second set time T2B, and performs greasing via the third distributor 54-3 during a period corresponding to 50% of the second set time T2B.

Thereafter, when the greasing time reaches the second set time T2B at time t8, the greasing control part 30c stops greasing.

Thereafter, when the non-greasing time reaches the first set time T1 at time t9, the greasing control part 30c resumes greasing. At this point, the greasing control part 30c executes the distribution ratio changing process of FIG. 7.

Specifically, the greasing control part 30c refers to the value of the high frequency flag, and in response to determining that none of the boom-related part, the arm-related part, and the bucket-related part is in high-frequency state during the latest non-greasing state over the first set time T1, the greasing control part 30c changes the second set time T2B back to the initially set second set time T2 and sets the ratio in which grease is distributed among greasing points to initial state (the distribution ratio 50:20:30).

In this case, the greasing control part 30c performs greasing via the first distributor 54-1 during a period corresponding to 50% of the second set time T2, performs greasing via the second distributor 54-2 during a period corresponding to 20% of the second set time T2, and performs greasing via the third distributor 54-3 during a period corresponding to 30% of the second set time T2.

Thereafter, when the greasing time reaches the second set time T2 at time t10, the greasing control part 30c stops greasing.

Thus, the automatic greaser 50 is configured to be able to individually change the amount of grease fed to one greasing point and the amount of grease fed to another greasing point based on information on multiple greasing points. Therefore, a shovel according to an embodiment of the present invention can more appropriately feed grease to each of multiple greasing points.

Figure 9:
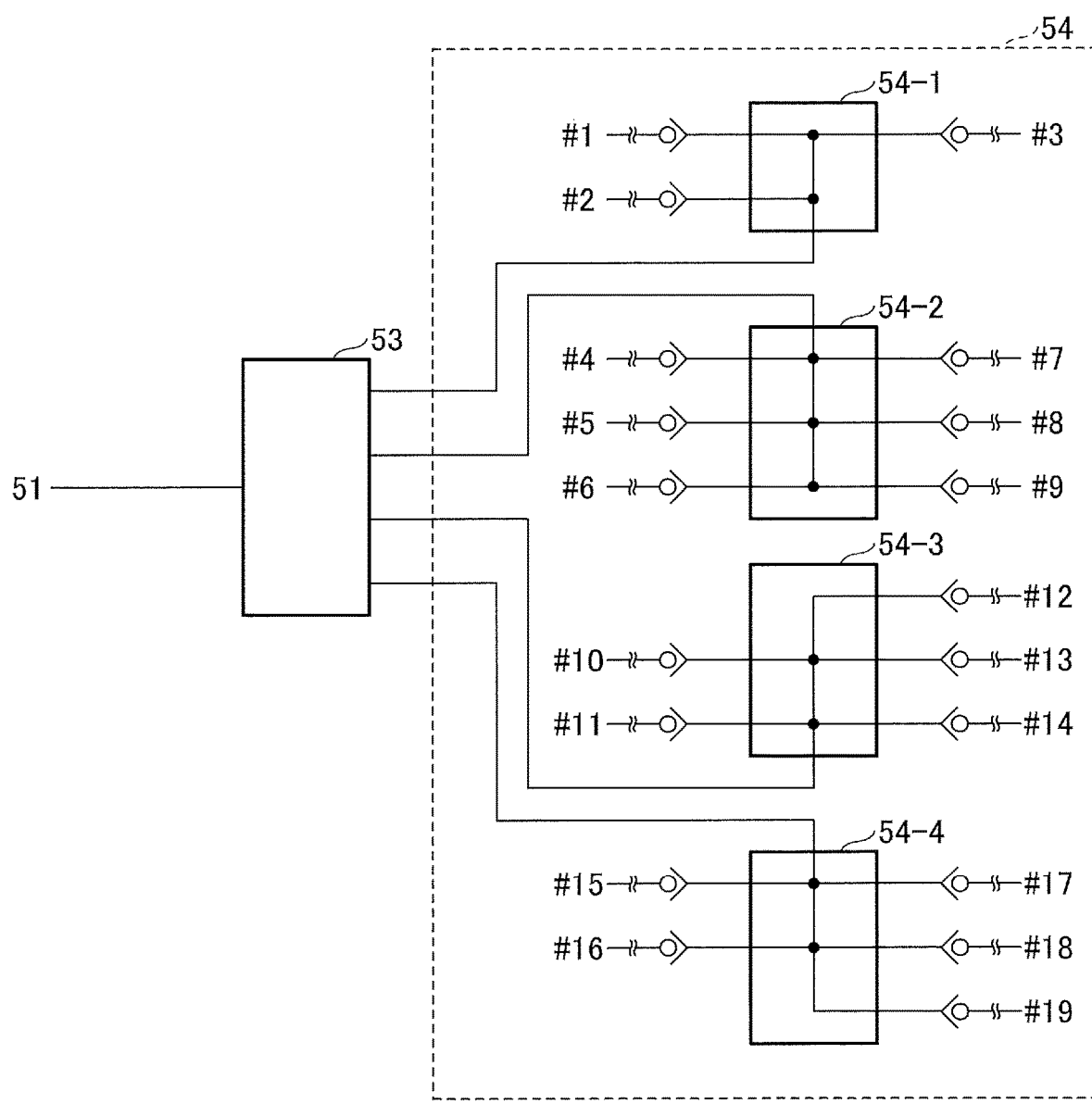
FIG. 9 is a diagram illustrating another example configuration of the distributor.

Next, another example configuration of the distributor 54 is described with reference to FIG. 9. The distributor 54 of FIG. 9 is different in including four distributors from, but otherwise equal to, the distributor 54 of FIG. 3, which includes three distributors. Therefore, a description of a common portion is omitted, and differences are described in detail.

According to the example of FIG. 9, the first distributor 54-1 includes one inlet port and three outlet ports. A check valve is attached to a hose extending from each outlet port. A hose extending from the inlet port is connected to the first outlet port of the solenoid valve 53. The hoses extending from the three outlet ports are connected to discharge ports placed at greasing points that are under the harshest lubrication condition in excavation work. The first distributor 54-1 is configured to discharge the same amount of grease as received at the inlet port from each of the three outlet ports in sequential order.

The second distributor 54-2 has one inlet port and six outlet ports. A check valve is attached to a hose extending from each outlet port. A hose extending from the inlet port is connected to the second outlet port of the solenoid valve 53. The hoses extending from the six outlet ports are connected to discharge ports placed at greasing points that are under the second harshest lubrication condition in excavation work. The second distributor 54-2 is configured to discharge the same amount of grease as received at the inlet port from each of the six outlet ports in sequential order.

The third distributor 54-3 has one inlet port and five outlet ports. A check valve is attached to a hose extending from each outlet port. A hose extending from the inlet port is connected to the third outlet port of the solenoid valve 53. The hoses extending from the five outlet ports are connected to discharge ports placed at greasing points that are under the third harshest lubrication condition in excavation work. The third distributor 54-3 is configured to discharge the same amount of grease as received at the inlet port from each of the five outlet ports in sequential order.

A fourth distributor 54-4 has one inlet port and five outlet ports. A check valve is attached to a hose extending from each outlet port. A hose extending from the inlet port is connected to a fourth outlet port of the solenoid valve 53. The hoses extending from the five outlet ports are connected to discharge ports placed at greasing points that are under the fourth harshest lubrication condition in excavation work. The fourth distributor 54-4 is configured to discharge the same amount of grease as received at the inlet port from each of the five outlet ports in sequential order.

According to this configuration, the distributor 54 of FIG. 9 can feed grease to up to 19 greasing points. In FIG. 9, #1, #2 ... #19 denote 19 greasing points. At least two of the 19 greasing points may be the same greasing point.

Table 2 illustrates another example of the correspondence relationship between greasing numbers and greasing points. According to this embodiment, as described above, greasing numbers #1 through #4 associated with the first distributor 54-1 are correlated with the discharge ports placed at the greasing points under the harshest lubrication condition in excavation work, and greasing numbers #5 through #9 associated with the second distributor 54-2 are correlated with the discharge ports placed at the greasing points under the second harshest lubrication condition in excavation work. Furthermore, greasing numbers #10 through 414 associated with the third distributor 54-3 are correlated with the discharge ports placed at the greasing points under the third harshest lubrication condition in excavation work, and greasing numbers #15 through 419 associated with the fourth distributor 54-4 are correlated with the discharge ports placed at the greasing points under the fourth harshest lubrication condition in excavation work.

TABLE 2

| Greasing Number | Greasing Point |
|---|---|
| #1 | ARM-SIDE LINK PIN GP11 OF FIRST BUCKET LINK 6A |
| #2 | ARM TOP PIN GP4 |
| #3 | ARM FOOT PIN GP3 |
| #4 | ROD-SIDE LINK PIN GPS OF ARM CYLINDER 8 |
| #5 | RIGHT SIDE GP10-LK OF ROD-SIDE LINK PIN GP10 OF SECOND BUCKET LINK 6B |
| #6 | LEFT SIDE GP10-LK OF ROD-SIDE LINK PIN GP10 OF SECOND BUCKET LINK 6B |
| #7 | BUCKET-SIDE LINK PIN GP12 OF SECOND BUCKET LINK 6B |
| #8 | RIGHT SIDE OF BOOM FOOT PIN GP2 |
| #9 | LEFT SIDE OF BOOM FOOT PIN GP2 |
| #10 | CENTER GP10-CY OF ROD-SIDE LINK PIN GP10 OF BUCKET CYLINDER 9 |
| #11 | RIGHT SIDE OF BOTTOM-SIDE LINK PIN GP5 OF BOOM CYLINDER 7 |
| #12 | LEET SIDE OF BOTTOM-SIDE LINK PIN GP5 OF BOOM CYLINDER 7 |
| #13 | RIGHT SIDE OF ROD-SIDE LINK PIN GP6 OF BOOM CYLINDER 7 |
| #14 | LEFT SIDE OF ROD-SIDE LINK PIN GP6 OF BOOM CYLINDER 7 |
| #15 | BOTTOM-SIDE LINK PIN GP9 OF BUCKET CYLINDER 9 |
| #16 | BOTTOM-SIDE LINK PIN GP7 OF ARM CYLINDER 8 |
| #17 | FRONT SIDE OF RING GP1 OF SWING MECHANISM 2 |
| #18 | REAR SIDE OF RING GP1 OF SWING MECHANISM 2 |
| #19 | PINION GEAR OF SWING HYDRAULIC MOTOR 2A |

As described above, a shovel according to an embodiment of the present invention includes the undercarriage 1, the upper swing structure 3 swingably attached to the undercarriage 1, and the automatic greaser 50 mounted on the upper swing structure 3. The automatic greaser 50 is configured to be able to individually change the amount of grease fed to one greasing point and the amount of grease fed to another greasing point based on information on the greasing points GP1 through GP12

According to this configuration, the shovel according to an embodiment of the present invention can more appropriately feed a lubricant to multiple greasing points. Therefore, it is possible to prevent a work element from moving with too much lubricant, with insufficient lubricant, with degraded lubricant, or with lubricant in which a foreign object is mixed at a high rate. As a result, it is possible to prevent the occurrence of lubricant leakage (sprinkling), poor lubrication, etc.

Furthermore, the shovel according to an embodiment of the present invention desirably includes the controller 30 serving as a control device to control the automatic greaser 50. The automatic greaser 50 desirably includes the grease pump 51 serving as a lubricant pump, the distributor 54 that distributes grease discharged by the grease pump 51, and the solenoid valve 53 serving as a selector valve placed between the grease pump 51 and the distributors 54. The controller 30 is desirably configured to be able to individually change the amount of grease fed to one greasing point and the amount of grease fed to another greasing point by controlling the solenoid valve 53 based on the infoLmation on the greasing points GP1 through GP12.

The information on the greasing points GP1 through GP12 may be, for example, information on the operating condition of the greasing points GP1 through GP12 or information on the work environment of the greasing points GP1 through GP12.

The information on the operating condition of the greasing points GP1 through GP12 is, for example, at least one of the total operation time of each particular part, the total amount of movement of each work element, the total amount of extension and retraction of each hydraulic cylinder, the cumulative value of the pin surface pressure or PV value of each pin, the temperature of each pin, how each work element is handled, etc. These information items are, for example, obtained using the information obtaining device 73 including the operating pressure sensor 29, angle sensors, and cylinder pressure sensors.

The information on the work environment of the greasing points GP1 through GP12 includes, for example, information on the work environment of each particular part. Specifically, the information on the work environment of the greasing points GP1 through GP12 includes at least one of whether a particular greasing point is under water, whether the ambient temperature of a particular greasing point is high, etc. These information items are, for example, obtained using the information obtaining device 73 including an image sensor and a distance sensor.

The greasing points GP1 through GP12 may be grouped by work element as illustrated in Table 1, for example, or may be grouped based on the harshness of a lubrication condition as illustrated in Table 2, for example. The automatic greaser 50 is desirably configured to be able to individually change the amount of grease fed to one group and the amount of grease fed to another group.

According to this configuration, the shovel according to an embodiment of the present invention can obtain the information on the greasing points GP1 through GP12 at an appropriate time. For example, as illustrated in Table 1, it is possible to individually adjust the amount of grease fed to the greasing points associated with the bucket 6, the amount of grease fed to the greasing points associated with the arm 5, and the amount of grease fed to the greasing points associated with the swing mechanism 2 and the boom 4. Also, as illustrated in Table 2, it is possible to individually adjust the amount of grease fed to greasing points under a harsh lubrication condition and the amount of grease fed to greasing points under a less harsh lubrication condition.

A preferred embodiment of the present invention is described in detail above. The present invention, however, is not limited to the above-described embodiment. Various variations, substitutions, etc., may be applied to the above-described embodiment without departing from the scope of the present invention. Furthermore, the features described with reference to the above-described embodiment may be suitably combined as long as no technical contradiction is caused.

For example, the greasing control part 30c may be configured as a device separate from and independent of the controller 30.

Furthermore, according to the above-described embodiment, the solenoid valve 53 is connected to discharge ports placed at multiple greasing points via the distributors 54. The solenoid valve 53, however, may alternatively be directly connected to discharge ports placed at multiple greasing points without the intervention of the distributor 54. For example, the solenoid valve 53 may be directly connected to each of the 19 greasing points.

Figure 10:
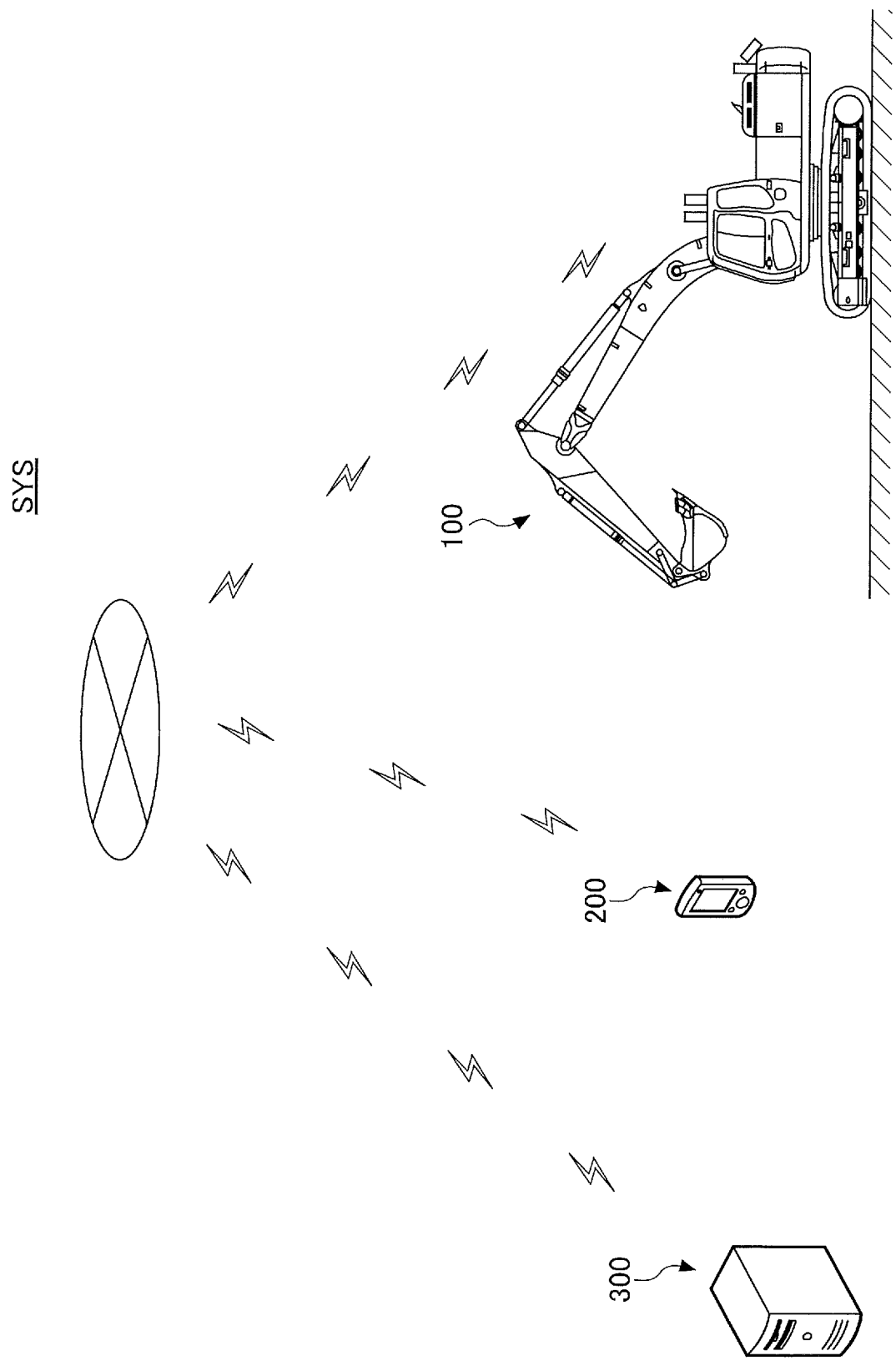
FIG. 10 is a schematic diagram illustrating an example configuration of a shovel management system.

Furthermore, information obtained by the shovel 100 may be shared with a manager, operators of other shovels, etc., through a shovel management system SYS as illustrated in FIG. 10. FIG. 10 is a schematic diagram illustrating an example configuration of the shovel management system SYS. The management system SYS is a system that manages a shovel 100. According to this embodiment, the management system SYS is constituted mainly of the shovel 100, an assist device 200, and a management apparatus 300. The shovel 100, the assist device 200, and the management apparatus 300 each include a communications device, and are directly or indirectly interconnected via a cellular phone network, a satellite communications network, a short-range radio communications network or the like. Each of the shovel 100, the assist device 200, and the management apparatus 300 constituting the management system SYS may be one or more in number. According to the example of FIG. 10, the management system SYS includes the single shovel 100, the single assist device 200, and the single management apparatus 300.

The assist device 200 is typically a portable terminal device, and is, for example, a computer such as a notebook PC, a tablet PC, or a smartphone carried by a worker or the like at a construction site. The assist device 200 may also be a computer carried by an operator of the shovel 100. The assist device 200, however, may also be a stationary terminal device.

The management apparatus 300 is typically a stationary terminal device, and is, for example, a server computer installed in a management center or the like outside a construction site. The management apparatus 300 may also be a portable computer (for example, a portable terminal device such as a notebook PC, a tablet PC, or a smartphone).

At least one of the assist device 200 and the management apparatus 300 (hereinafter, "assist device 200, etc.") may include a monitor and an operating device for remote control. In this case, the operator operates the shovel 100 using the operating device for remote control. The operating device for remote control is connected to the controller 30 through, for example, a communications network such as a cellular phone network, a satellite communications network, or a short-range radio communications network.

According to the shovel management system SYS as described above, the controller 30 of the shovel 100 may transmit information on greasing to the assist device 200, etc. The information on greasing includes, for example, at least one of information on timing to start greasing by the automatic greaser 50, information on timing to end the greasing, information on greasing points, information on the amount of greasing, information on settings information, information on operating condition information, information on the time at which it is determined that the work load or operation frequency of a particular par is high (hereinafter "determination time"), information on the position of part of the machine body at the determination time, information of the work details of the shovel 100 at the determination time, information on a work environment at the determination time, information on the movement of the shovel 100 measured at the determination time and during a period before and after it, etc. The information on a work environment includes, for example, at least one of information on ground inclination, information on weather, etc. The information on the movement of the shovel 100 includes, for example, a pilot pressure, the pressure of hydraulic oil in a hydraulic actuator, etc.

The controller 30 may be configured to periodically transmit the information on greasing to the assist device 200, etc., or may be configured to transmit the information on greasing to the assist device 200, etc., when a predetermined condition is satisfied. The predetermined condition is, for example, that it is determined that the work load or operation frequency of a particular part is high, or the like.

The controller 30 may transmit images captured by an image capturing device to the assist device 200, etc. The image capturing device is configured to capture an image of a space surrounding the shovel 100, and may be attached to the shovel 100 or may be attached outside the shovel 100. The images may be, for example, multiple images that are captured during a predetermined period including the determination time. The predetermined period may include a period preceding the determination time.

Furthermore, the controller 30 may transmit at least one of information on the work details of the shovel 100, information on the pose of the shovel 100, information on the pose of the excavation attachment, etc., during a predetermined period including the determination time to the assist device 200, etc. This is for enabling a manager using the assist device 200, etc., to obtain information on a work site. For example, this is for enabling the manager to analyze the cause of the occurrence of a situation where the ratio in which grease is distributed among greasing points has to be changed, and further for enabling the manager to improve the work environment of the shovel 100 based on the results of the analysis.

What is claimed is:

1. A shovel comprising:
an undercarriage;
an upper swing structure swingably attached to the undercarriage;
an automatic greater mounted on the upper swing structure, the automatic greater including
a lubricant pump;
a plurality of distributors configured to distribute a lubricant discharged by the lubricant pump to a plurality of greasing points, the lubricant being a grease; and
a selector valve placed between the lubricant pump and the plurality of distributors, the selector valve being configured to selectively connect one of the plurality of distributors to the lubricant pump; and
a hardware processor configured to control the automatic greaser,
wherein the hardware processor alternately achieves a non-greasing state that continues for a first set time and a greasing state that continues for a second set time whose length is fixed,
the hardware processor determines a distribution ratio according to which the second set time is divided into a plurality of greasing times for feeding the grease to the plurality of distributors in the greasing state, based on a work load on each of the plurality of greasing points or an operation frequency of each of the plurality of greasing points, and selectively feeds the grease to the plurality of distributors according to respective greasing times allotted to the plurality of distributors within the second set time in the greasing state, the greasing times being allotted to the plurality of distributors according to the determined distribution ratio, and
the hardware processor distributes the grease to the plurality of greasing points according to the greasing times allotted to the plurality of distributors according to the distribution ratio that is initially set in the greasing state, in response to determining that a value representing the work load or the operation frequency is less than a predetermined value in the non-greasing state immediately before the greasing state, and changes the distribution ratio and distributes the grease to the plurality of greasing points according to the greasing times allotted to the plurality of distributors according to the changed distribution ratio without changing the length of the second set time to increase an amount of grease fed to a greasing point among the plurality of greasing points in the greasing state, in response to determining that the value representing the work load on or the operation frequency of the greasing point is more than or equal to the predetermined value in the non-greasing state immediately before the greasing state.

2. The shovel as claimed in claim 1, wherein the hardware processor determines the work load on each of the plurality of greasing points based on information on a work environment of the plurality of greasing points.

3. The shovel as claimed in claim 1, wherein
the plurality of greasing points are divided into a plurality of groups by work element, and
the hardware processor individually changes an amount of grease fed to a first group among the plurality of groups and an amount of grease fed to a second group among the plurality of groups by controlling the selector valve.

4. The shovel as claimed in claim 1, wherein
the plurality of greasing points are divided into a plurality of groups based on harshness of a lubrication condition, and
the hardware processor individually changes an amount of grease fed to a first group among the plurality of groups and an amount of grease fed to a second group among the plurality of groups by controlling the selector valve.

5. The shovel as claimed in claim 1, wherein the selector valve is a single solenoid valve having one inlet port connected to a discharge port of the lubricant pump and having a plurality of outlet ports each connected to a different one of the plurality of distributors.

6. The shovel as claimed in claim 1, wherein each of the plurality of distributors has one inlet port connected to the selector valve and has at least one outlet port connected to a discharge port placed at one of the plurality of greasing points.

7. The shovel as claimed in claim 1, wherein the automatic greater performs no greasing during the non-greasing state, and performs greasing during the greasing-state.

8. The shovel as claimed in claim 1, wherein the hardware processor alternately repeats the non-greasing state and the greasing state.

* * * * *